United States Patent [19]

Peranio

[11] Patent Number: 4,467,788
[45] Date of Patent: Aug. 28, 1984

[54] SOLAR ENERGY ACTUATED APPARATUS FOR DISTILLING WATER FROM LIQUIDS AND SOLIDS

[76] Inventor: Anthony Peranio, 48 E. Erie St., Blauvelt, N.Y. 10913

[21] Appl. No.: 435,906

[22] Filed: Dec. 14, 1982

[51] Int. Cl.³ ............................................... F24J 3/02
[52] U.S. Cl. .................................... 126/433; 126/434
[58] Field of Search ............... 126/417, 432, 433, 434, 126/435, 441, 444, 445, 449, 450

[56] References Cited

U.S. PATENT DOCUMENTS

| | | | |
|---|---|---|---|
| Re. 31,032 | 9/1982 | French | 126/433 |
| 2,553,073 | 5/1951 | Barnett | 126/434 |
| 3,987,782 | 10/1976 | Meier | 126/434 |
| 4,003,367 | 1/1977 | Wikholm | 126/434 |
| 4,033,325 | 7/1977 | Walker | 126/434 |
| 4,083,359 | 4/1978 | Smith | 126/433 |
| 4,192,290 | 3/1980 | Jensen | 126/434 |
| 4,213,448 | 7/1980 | Hebert | 126/434 |
| 4,258,701 | 3/1981 | Buckley | 126/450 |
| 4,294,229 | 10/1981 | Maloney | 126/434 |
| 4,314,667 | 2/1982 | Sigworth | 126/434 |

Primary Examiner—Daniel J. O'Connor

[57] ABSTRACT

The apparatus of the disclosed invention uses solar energy that impinges upon it for the purposes of distilling water from solutions and mixtures and for drying out of agricultural produce and other materials containing water.

In a single apparatus, the multiple effects of heating, vaporization, condensation, and circulation of an air-vapor mixture are made to take place. The result of this integrated action is to produce distilled water and/or dried produce at the expense of the solar energy captured on the collector of the apparatus.

The apparatus of the invention comprises a closed, inclined box-like structure with a large window facing the sun. Inside the box, a combined collector-thermally insulated septum divides the box space into two substantially equal volumes; the upper volume being used for heating and vaporization of the water solution being distilled (or the produce being dried) by the solar energy coming through the window opposite the collector plate, and the lower volume being used for cooling the heated air-vapor mixture circulating around the box and thereby producing condensation and distilled water.

Each end of the box (upper and lower) contains an opening permitting free circulation of the air-vapor mixture; which circulation occurs due to the chimney effect, or thermosiphoning effect, whereby the colder air in the lower part of the boxes tends to move downwards, and the hotter air in the upper volume of the box tends to move upwards.

1 Claim, 5 Drawing Figures

SOLAR ENERGY ACTUATED APPARATUS FOR DISTILLING WATER FROM LIQUIDS AND SOLIDS

SUMMARY

The apparatus of this invention uses solar energy to heat air for the purposes of distillation of water from solutions and mixtures and the drying out of agricultural produce and other materials containing water.

It accomplishes this by integrating the multiple physical effects of heating, vaporization, condensation, and circulation of an air-water vapor mixture in a single apparatus that operates automatically to produce distilled water and/or dried produce entirely from the solar energy that passes through its window.

The distilling embodiment of the invention comprises: an inclined solar box with a window on its inclined face; an internal partition parallel with the window and placed so as to divide the box space into two equal areas; a solar energy collector plate on the upper face of the partition, facing and parallel with the window, and thermal insulation covering the lower face of the partition, over its whole area, so that the upper volume of the box becomes an evaporating section, and the lower volume of the box becomes the condenser section; openings between the upper part of the partition and the box and the lower part of the partition and the box wall so as to permit circulation caused by convective action when solar energy passes through the window and impinges on the collector generating heat inside the box; means for conveying heat out of the apparatus through a condenser placed in the shaded wall of the box; means for introducing impure water into the evaporating section of the apparatus; means for extracting the collected impure water after distillation; and, means for collecting and extracting distilled water from the condenser section of the apparatus for distillation.

The embodiment of the invention for drying produce requires open racks over the collector plate to hold the produce in the closed solar box during operation, and collection and extraction means for the distilled water produced in the condenser section.

For increased thermal efficiency, the solar box of the apparatus should be lagged with thermal insulation.

The apparatus can distill or extract about 2 liters of water per hour per square meter of collector area.

The relatively low cost of constructing and operating this simple equipment makes it competitive with devices operated from fossil fuels.

PURPOSE

The apparatus of this invention provides means for the exploitation of solar energy to heat air for the purposes of distillation of water from liquid solutions and mixtures of all types, and the drying out of agricultural produce and other materials containing water.

An additional purpose of the invention is to carry out the multiple physical effects of heating, vaporization, condensation, and circulation of the air-vapor mixture in a single, integrated apparatus that operates automatically to produce distilled water and/or dried produce using solar energy alone.

THE PREVIOUS ART

With regard to the distillation of saline water, for example, one form of solar apparatus takes seawater, preheated under a plastic dome, and then pumps this up to the top of a small tower where the seawater is released in droplets that serve to saturate air in the tower. The saturated air then flows to a separate condenser tower where the water is condensed and is ready for use. This system uses various pumps and blowers, which require outside power (usually electricity) and these entail considerable expense for purchase of equipment.

According to the new art of this invention, the several physical effects of heating, vaporization, condensation, and circulation of the air-vapor mixtures involved are integrated into a single apparatus that is the same time economical, simple to build and efficient thermodynamically; without the need for outside power, or any pumps or blowers for circulating air and liquids. All that is required is that the impure water to be distilled be supplied to the apparatus at its top inlet, and that solar energy be allowed to pass through the window of the apparatus. Distilled water will then be discharged automatically at the lower part of the apparatus along with a separate discharge of the concentrated impure mixture remaining after distillation.

With respect to current stills of simple construction it has been found that they can be built inexpensively, but these stills are inefficient in that they require relatively large collector areas to accomplish the distillation. For example, a simple still built of a plastic or glass window over a blackened insulated box, may distill about 5 liters of water per day for every square meter of collector area. A multiple effects still (as described above) is capable of producing about 3 times this amount per square meter of collector. The basic reason for this is that the condensing efficiency of the window is poor.

In the apparatus of this invention the efficiency of the multiple effect system is obtained in an apparatus approaching the simplicity and low cost of the window and insulated blackened box distilling apparatus.

Concerning the drying of agricultural and other produce, current practice is to use a window over an insulated and blackened box into which the produce is loaded for drying. The box is provided with a lower opening for introducing ambient air, and an upper opening through which the hot and moist gases discharge.

In the case of the apparatus of this invention, once the air is heated it is circulated over and over again at an average temperature considerably above that of the air in the ambient atmosphere. Moisture is taken out by the condenser, and the circulating air is cooled somewhat in this stage, but the temperature of this circulating air, as it once again enters the evaporating section of the apparatus of this invention, is considerably higher than that of the outside, ambient air. This leaves more heat energy (supplied by the sun) available for the task of vaporizing the moisture contained in the produce being dried. Therefore, here too, on the basis of the collector size, drying efficiency is higher in the apparatus of this invention. This is accomplished by virtually no extra cost in constructing the apparatus, as will be seen from the description and figures for the embodiments of the invention presented.

VALUE OF THE INVENTION

The processes of distillation of water-based mixtures and those of drying out of moisture from produce are widely used for industrial, agricultural, and domestic purposes. Considerable valuable energy is required to work these processes and this energy usually takes the form of electricity (usually derived from the burning of fossil fuels), or the fossil fuels themselves are burned. Rising costs for these forms of energy now make it economically worth while to turn to solar energy for distillation and drying. In many areas there is no access to electric power lines, as in many desert areas of Israel and adjoining nations. Further, local sources of wood or other biomass (such as animal dung) is either scarce or non existent. The use of fossil fuels is prohibitive both because of high purchase price and transportation costs.

Therefore, systems for converting solar energy into heat for carrying out essential requirements such as cooking, distillation, and dehydration of produce for long term storage, for example, can prove a boon to a large and ever growing number of people in the world requiring this energy.

Backed up with wind energy, the embodiments of the apparatus of this invention can be used without the addition of electrical, mechanical, or other energy.

Thus, as will be seen from the description of the apparatus, if it is set up at a seaside location, or inland over a source of saline or brackish water, it can be used to produce distilled water from solar energy. To ease the task of supplying water to the apparatus, a windmill and pump system can be used to raise and store water for the apparatus. Combined, these two forms can ensure a continuous supply of pure water. This can be mixed with a certain amount of saline water, and the mixture used for agriculture. The agricultural products produced can be dehydrated and conserved for long periods using the embodiment of the apparatus of the invention that dries produce using solar energy.

All this can be manufactured from currently available materials such as plywood, galvanized sheet, aluminum sheet, glass, transparent plastic sheet, pupes, and fittings for water systems. No exotic materials are required and neither is there need for "high technology". Manpower exists in most parts of the world to build, operate, and maintain the simple, cheap, and effective machines embodied in this invention.

LIST OF DRAWINGS

DESCRIPTION OF THE INVENTION

Figure 1:
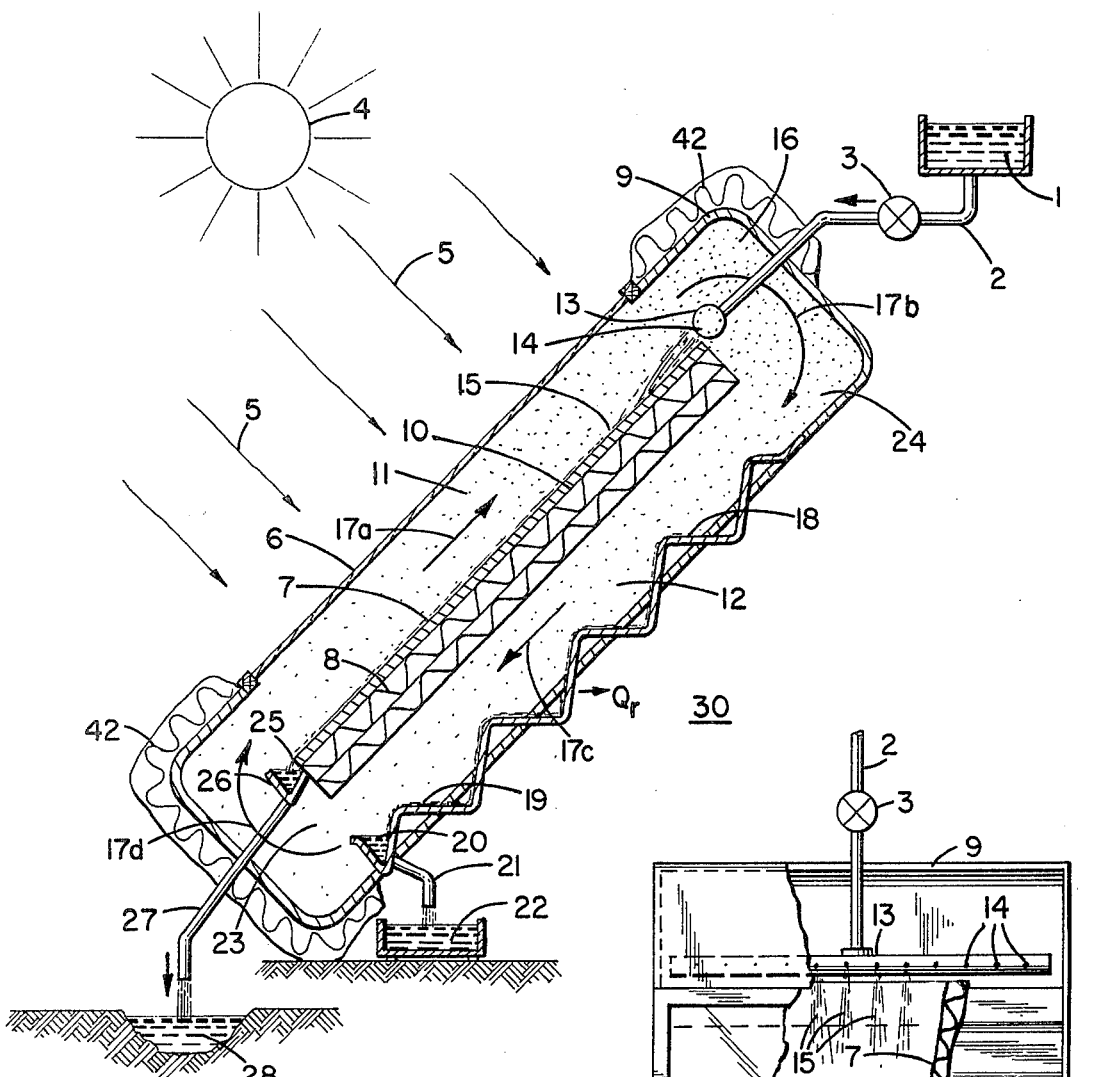
FIG. 1 is a cross section view from the side of the distillation apparatus of this invention.
Figure 2:
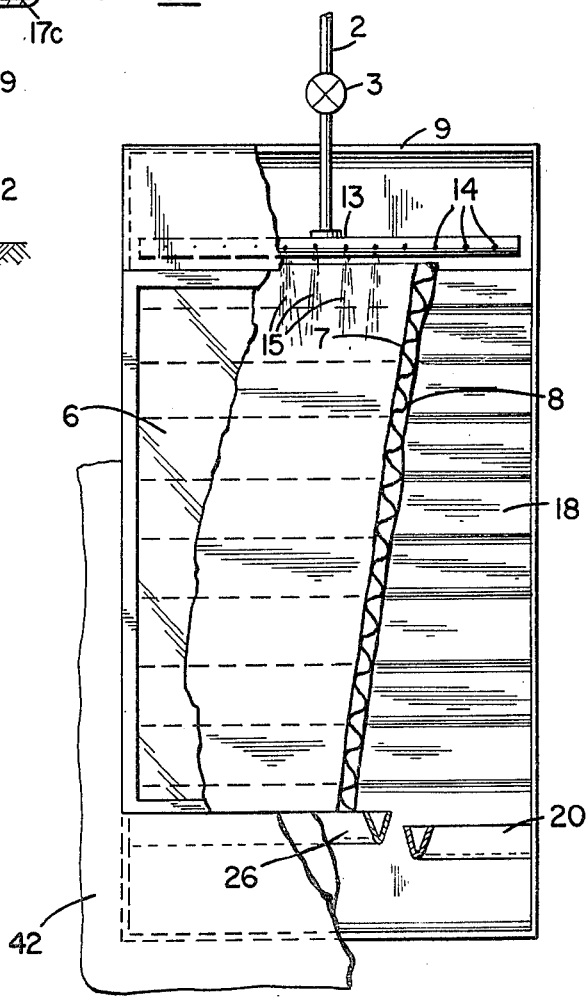
FIG. 2 is a view from the front of the same.

FIGS. 1 and 2 show an embodiment of the apparatus of the invention in operation whereby a source of water (1) to be purified by distillation is supplied to the apparatus through supply pipe (2) and a flow control valve (3) at a rate suitable for the size and operating conditions of the distillation apparatus.

The entire source of energy required for the distillation of the brackish, saline, or otherwise impure water (1) supplied to the apparatus is derived from the sun (4) whose solar radiation (5) is permitted to impinge upon the apparatus of this invention so that it passes through a window (6) transparent to most of the radiation lighting upon it. After passing through a window (6), the solar radiation (5) impinges upon an inclined blackened collector plate (7) which acts to convert the solar radiation to heat energy and thereby raises the temperature of this collector plate. The collector plate also has attached firmly to its reverse side a thickness of thermal insulation (8) that is the same area of the collector plate (7). The purpose of the thermal insulation (8), which could be, for example, a piece of polystyrene foam several centimeters in thickness and matching the area of the collector plate (7), is to prevent the heat energy emitted from the collector plate from being conducted or radiated to any other part of the distillation apparatus of this invention but that part and volume directly in front of and above the face of the collector plate that receives the sun's radiation.

The combination of the collector plate (7), and the thermal insulation (8) are mounted in such a way in the box (9) of the apparatus of the invention as to form a partition (10) which divides the box (9) into two approximately congruent shapes and symmetrical volumes with respect to the partition. These two volumes will be designated as the evaporating section (11) and the condensing section (12) of the distillation apparatus of the invention.

To obtain distilled water from the apparatus of the invention, solar radiation (5) is allowed to impinge upon it as described previously, and the water (1) to be purified is permitted to flow out of manifold pipe (13), through a multiplicity of small orifices (14) to form a number of water streams (15) that fall, under gravity's action, and impinge upon the upper face of collector plate (7) and thereafter flow down along the collector's face, in ever widening streams to wet a significant portion of the collector plate's surface; say 40% or so. Due to the raised temperature of the collector plate's surface, two effects will be obtained; the temperature of the water streams (15) will be raised, as will the temperature of the air in the evaporating section (11). Consequently, a water vapor cloud (16) will be formed.

At the same time, it is recognized that the temperature of the air in the condensing section (12) of the apparatus is significantly lower than that in the evaporating section (11) for two reasons. First is that the condenser (18) and the volume into which it faces are in the shade of the box (9) of the apparatus. Then, it is the purpose of the condenser to encourage the passage of heat from the hot air and water vapor mixture to the air in the outside environment. Therefore, because of the temperature differences the densities of the air and water vapor mixtures will be different and a convective current circulation will be obtained. This will cause clockwise rotation of the air and vapor in the apparatus (in the case of FIG. 1) whereby the lighter air and water vapor cloud in the evaporating section (11) will rise in the box (9) on the left side, and the heavier, colder, and less moist air in the condensing section (12) will move downwards.

Thus, with solar energy entering the apparatus, once sufficient solar energy has been converted to heat by collector plate (7), this circulating action will begin and continue uninterrupted until the sun's rays stop reaching the window (6) of the apparatus. As a consequence of the circulation, indicated by arrows (17a, 17b, 17c, and 17d) the water vapor cloud (16) will be carried from the evaporating section (11) into the cooler condensing section (12), where the air water vapor mixture will come into contact with the inner surface of the folded plate condenser (18). The water vapor and air will give up some of their heat ($Q_r$) to the cooler condenser (18), which passes this heat to the cooler environment (30).

Part of the vapor will condense to water (19) which will drip and flow down along the inner surface of the condenser plates until it reaches the trough (20) for collecting the distilled water. A pipe (21) is used to discharge the distilled water out of the apparatus and into a collection tank (22).

The circulating air at the outlet (23), of the condenser is now considerably cooler and drier than the circulating air and vapor mixture coming into the condenser at the inlet (24), to the condenser. This heavier air then acts to push up on the hotter and wetter air in the evaporating section, and the circulating action continues unabated as explained previously.

Thus, given access to solar energy, and an input of impure water, the solar distillation apparatus of this invention will provide an output of distilled water in a continuous and automatic fashion. Once the input flow of impure water to the apparatus is adjusted, the apparatus requires no attention and no energy input other than that obtained from solar radiation.

Figure 3:
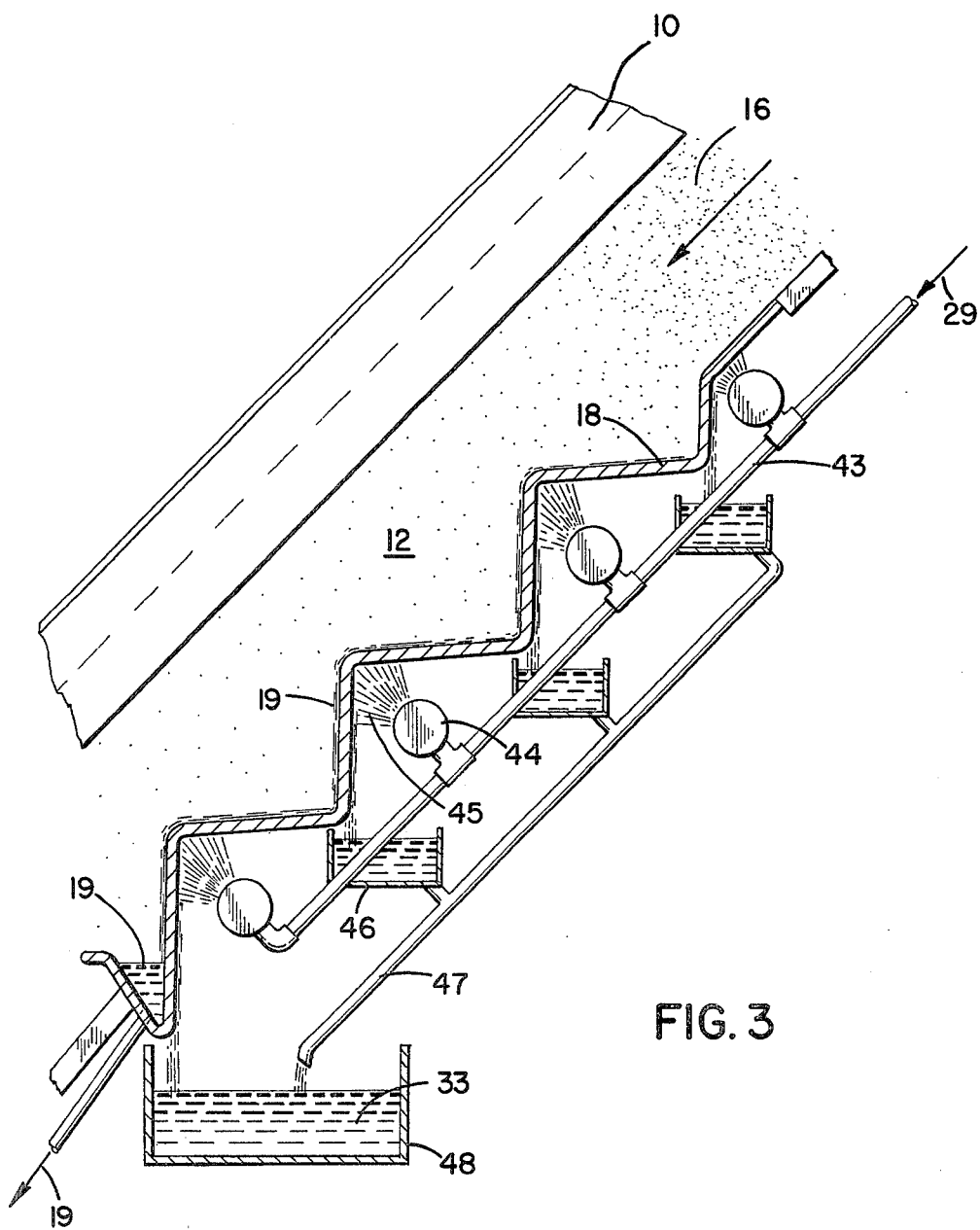
FIG. 3 is a cross section of the condenser of the apparatus of the invention.

FIG. 3 shows a cross section of the condenser (18) with distilled water (19) running down its folded plate inner surface. To increase condenser efficiency, the condenser is cooled on its outer surface by cooling water (29) supplied through a series of manifold and spray orifice pipes (44) fed from the spray water supply pipe (43) so as to produce a series of cooling water spray clouds (45) that impinge upon the condenser's external surfaces. The excess heated condenser water (33) is collected in a series of troughs (46) placed under the surfaces of the condenser from which the spray water drips. The troughs are interconnected and are drained by pipe (47) into a condenser cooling water collection tank (48). The cooling water (29) helps the condensing process in two ways; direct conduction (since the temperature of this cooling water will generally be considerably below that of the condenser plate), and, by an evaporative cooling effect, whereby the cooling water requires and absorbs heat from the condenser plate to evaporate that portion which vaporizes into the air of the environment (30). This cooling water (29) can generally be provided from the same source of water (1) that is impure and requires distillation. Depending upon atmospheric conditions (environmental air temperature, humidity, and wind speed for example) and the quality of the impure water, the use of the cooling water (29) as shown in FIG. 3 can add considerable distilling capacity to the apparatus of this invention.

Figure 4:
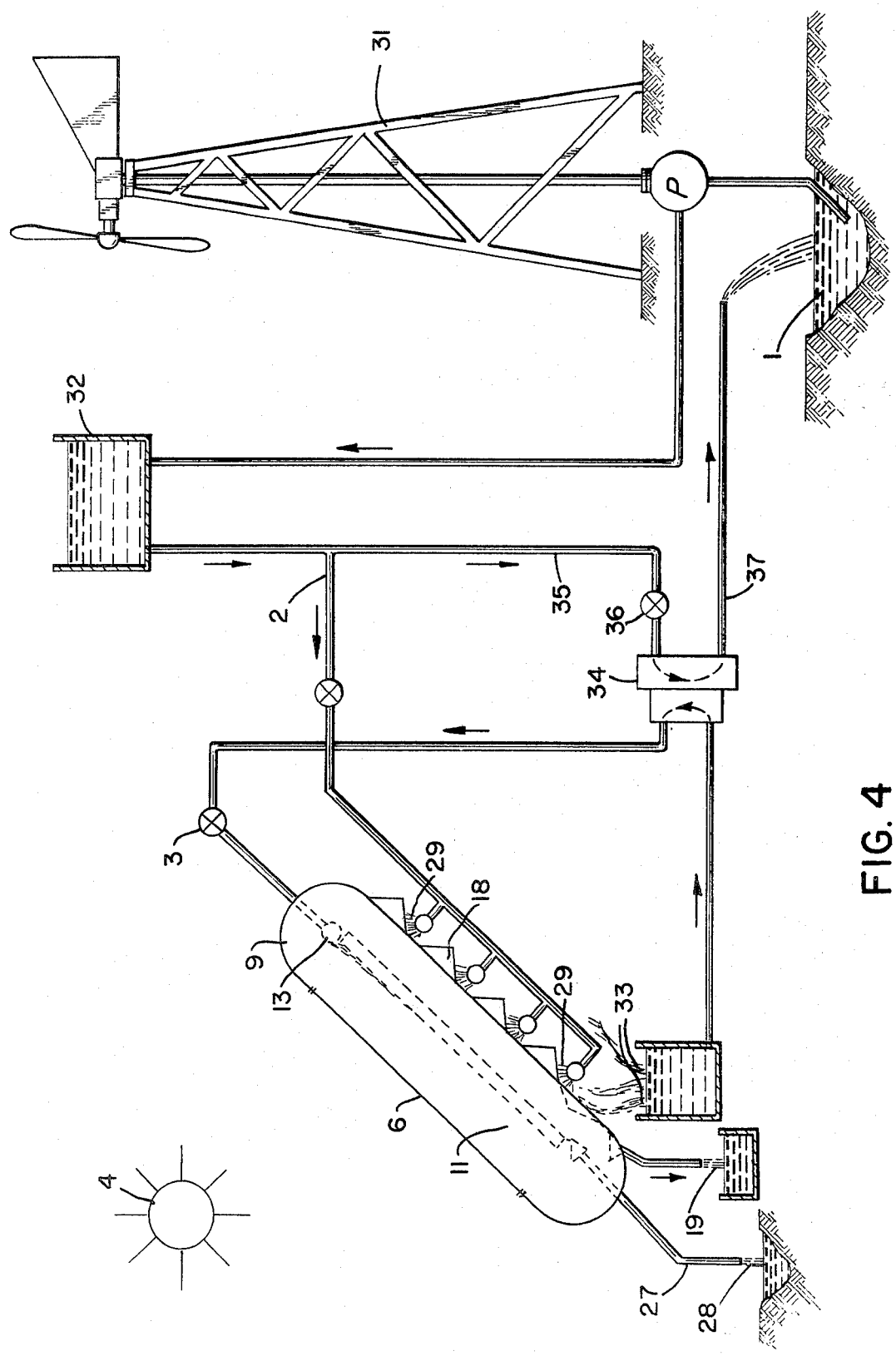
FIG. 4 is a schematic diagram illustrating a working example of the distillation apparatus of the invention.

FIG. 4 gives a practical example of how the apparatus of the invention can be used in a system which uses environmentally available power (solar and wind energy) in order to produce distilled water without the application of any other form of energy, such as electricity, to accomplish this task. Additionally, it produces this water with minimal human attention.

The dimensions of the window (6) in the embodiment of the apparatus of the invention shown in FIG. 4, by way of example only, are 3 meters along the vertical direction and 6 meters in width. The axis of the box (9), container, shell, or other enclosure of the apparatus is inclined about 50° with respect to the horizontal. To lift the brakish, saline or otherwise impure source of water (1), a wind driven propeller and pumping system (31) is employed. The impure water (1) is pumped into an overhead tank whose lowest level is about 6 meters above the level of the supply water (1).

From the overhead tank (32) a supply pipe (2) of 1-inch size carries impure water to the distillation apparatus and discharges it as cooling water (29) into the external face of the condenser (18) at a rate of about 320 liters/hour, using sprays of water (45) as explained in FIG. 3.

After falling off the plates of the condenser, and collecting in tank (33) the now heated impure water is lifted by a hydraulic ram (34) to thus becomes the supply water for the apparatus as it discharges from the manifold pipe (13) into the evaporating section (11). The rate of flow of this supply water is adjusted to about 300 liters/hour by valve (3).

Driving power for the hydraulic ram (34) is derived from water supplied to it through supply pipe (35), $1\frac{1}{2}''$ in size, supplying about 800 l/h to the ram, which flow is controlled by valve (36). After extraction of its energy the spent ram drive water (37) is discharged back into the impure water supply source (1).

The distilling action for the example of FIG. 4 is similar to that described for FIGS. 1 and 2, with the difference that higher efficiency of distillation is obtained in the apparatus of FIG. 4, since the impure water being supplied in this case, is of higher temperature because it has picked up part of the heat required for condensing the vapor in condenser (18). Therefore, more solar energy will go into vaporizing the water in the evaporating section (11) and less into raising the water's temperature to that of the equilibrium temperature in the evaporating section. As previously, however, all the unevaporated impure water collected in the trough (26) is discharged to a wastewater sump (28). For the example of FIG. 4, the waste, impure, more concentrated water will amount to about 250 l/h. The distilled water in tank (22) will be produced at a rate of about 25 liters/hour on an average sunny day in Israel, using a collector of 18 $m^2$.

In order to ensure an adequate impure water supply for the distillation apparatus described in FIG. 4 as an example, a windmill and pump system can be used to raise and store water in sufficient volume so that even during a spell of 3 or 4 calm days, there will be sufficient impure water in the tank (32) to keep the apparatus operating as long as there is sunshine. For this specific example, the requirements are a propeller of about 2 meters in diameter, coupled to a pump capable of lifting about 6 cubic meters per hour (2-inch or 3-inch size), to a height of 8 meters, when a 20km/h wind is blowing.

Figure 5:
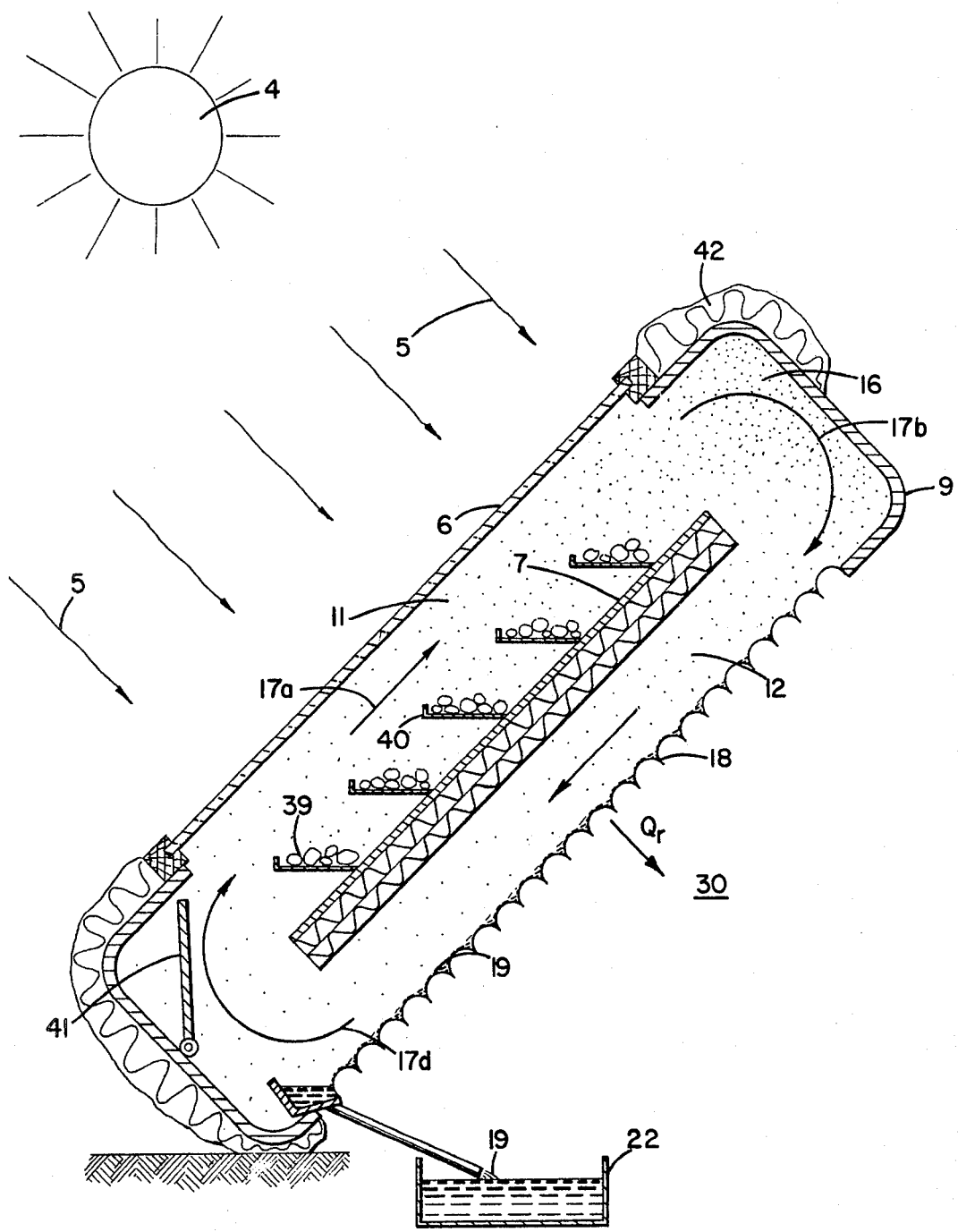
FIG. 5 is a cross section view from the side of the produce drying apparatus of this invention.

FIG. 5 shows an embodiment of the apparatus of the invention having particular use for the drying of fruit, vegetables, and other agricultural products, the energy for which is derived from the sun (4), the rays of which pass through a window (6) of the apparatus; all enclosed and mounted in the box (9). In this embodiment too, the box (9) of the apparatus is divided into two symmetrical volumes by the joined collector plate (7) and the thermal insulation (8) so that an evaporating section (11) and condensing section (12) are formed. The fruit, vegetables, or other agricultural produce (39) to be dried are held in place by a series of open racks (40) either touching or just above the collector plate (7). The loading and unloading of the vegetable produce in to the apparatus is done by removing the window (6) in its frame, and utilizing the opening in the upper face of the box (9). Or a special loading hatch or opening could be provided for this purpose.

In any case, the apparatus should not be overloaded, and about 50% of the area of the blackened collector plate (7) should be able to "see" solar radiation". As the air in the drying box heats up, and the agricultural produce likewise, the moisture contained in the produce (39) will begin to evaporate and form a water vapor cloud (16) very much as described for the case of distillation considered previously. The hot, moist, lighter air-vapor mixture in the evaporating section, (11) will rise, and that in the cold, drier, heavier air-vapor mixture in the condensing section (12) will fall, and convective circulation will be created as indicated by the circulation direction arrows (17a,b,c,d). As a consequence of heat rejection ($Q_r$) to the environment (30), condensing will occur, and distilled water (19) will form on the condenser's (18) inner surface, which water will trickle, flow down and out of the apparatus for collection in the tank (22).

The cooler, drier air, will continue downwards to begin a cycle once again of heating, evaporation, circulation, condensing, etc. To adjust the rate for flow of circulation, which is required for control over the temperature of drying, a control baffle (41) is provided.

To ensure strong convective current action, the vertical height of the box of the apparatus should be about 3 meters or so. When very high temperatures are required for certain types of produce, the box (9) should be lagged by thermal insulation (42) as shown.

In the description presented in this specification of the invention, sufficient details have been disclosed enabling those versed in the arts of engineering and science to construct working apparatus for the distillation of water from liquids and solids and combinations of these.

The choice of materials of construction and types of components for the apparatus are legion and cannot be disclosed in entirety here. For example, the solar box (9) could be made of plywood, concrete, metal plates, any sold enclosure that is either thermally insulating by itself or can have thermal insulation added to it. Regarding thermal insulation, this could be cork, rock wool, glass wool, any of the rigid or flexible plastic foams, dead air space, or even shredded wood and paper. The solar collector plate (7) could be made of any material impervious to water and able to withstand the temperatures reached in the evaporating section; about 150° C. as a maximum. The plate could be entirely flat, wavy or ridged, for example; these various forms making only marginal differences on the overall efficiency of operation of the apparatus. It is significant, however, to have sufficient thermal insulation backing up the collector so as to ensure no more than a small degree of heat transfer from the evaporating section (11) to the condensing section (12).

The method of introduction of water into the apparatus is also not critical. This could be done as given in the example of the embodiments disclosed here; that is, in the form of a series of small streams of liquid distributed over the upper face of the collector plate, using gravity to draw the water down. Another possibility is in the form of relatively large size droplets from one or more discharge heads at the top of the apparatus. Or, a drip type of orifice(s) could be used instead. Once again these several forms when compared with one another will not make a qualitative difference in the operation of the solar still.

Finally, with regards to the condenser: There are any number of condenser types that could be applied to this apparatus. Some air cooled, others water cooled, and still others both air and water cooled. Which is to be preferred is a matter of cost-benefit. The efficiency of the condenser (which has a significant effect on the efficiency of the solar still) will generally be linked to its cost; a more costly condenser generally being more efficient. Which is chosen depends upon the price of distilled water, costs of other forms of energy (electricity, petroleum, coal), and operation costs The embodiment shown is a relatively simple but effective folded plate condenser that is amongst the least expensive.

Having now described in detail the embodiments of my invention, What is claim is:

1. An improved solar energy actuated apparatus for distilling water from liquids and solids comprising in combination: A box-like enclosure with a window transparent to most of the solar energy permitted to irradiate it mounted in an open face of this enclosure; an internal partition member mounted substantially parallel with the plane of the window apparatus, placed below said window, and so placed as to divide the internal space of the box of the apparatus of the invention into two substantially equal interconnected volumes, which interconnection is afforded by allowing substantially equal spaces between the partition of the apparatus, at each of its ends, and the walls of the box of the apparatus; a solar energy collector plate, essentially the same size in area as the partition of the apparatus mounted and joined to said partition on the partition's upper face, facing and parallel with the plane of the window of the apparatus; a thickness of thermal insulation covering the lower face of the partition of the apparatus in its entirety, which combination of collector plate, partition, and thermal insulation form a physical barrier which divides the internal volume of the box of the apparatus of the invention into two interconnected parts designated as the evaporating section (upper part) and condensing section (lower part); condenser means for conveying heat out of the condenser section of the box mounted in the lower or shaded wall of the box of the invention; means for introducing liquids and/or solids into the evaporating section of the box of the apparatus of the invention so that they are exposed to the hot air and the solar radiation contained therein; means for removing the spent liquids and/or solids from the evaporating section after distillation of water from them; and means for collecting and removing from the condensing section of the box of the apparatus of the invention the distilled water that is formed and collects there, it being understood that the geometry of the apparatus of the invention, and its orientation with respect to incident solar radiation is such as to encourage satisfactory continuous thermal convective circulation of the air and water vapor mixtures formed in the apparatus. wherein the means for introducing the liquids into the evaporating section of the apparatus comprises a supply pipe carrying the liquid from which water is to be distilled connected into a manifold mounted over the upper edge of the collector plate of the apparatus of the invention, which manifold is provided with discharge means to make the liquid flow over the collector plate, so that all the streams or large droplets formed during the discharge of the liquid from the discharge means will flow, under the action of gravity, downward over the heat surface of the collector plate in order that evaporation of water contained in the liquid will be encouraged, wherein the means for introducing solid produce into the evaporating section of the apparatus, and removing it therefrom after sufficient water has been distilled from it, is by way of an opening in the box of the apparatus, covered by a suitable cover during operation of the apparatus, and opened only during the required loading and unloading operations of the produce to be dried; which apparatus for drying solid produce is provided with substantially open racks mounted over the collector plate of the apparatus, and distributed over said face so that the produce being dried will be held by such racks during the drying out operation and will be exposed to the solar energy and to the hot air circulating through the evaporating section; which produce to be dried is loaded into the evaporating section and onto the racks therein in a quantity which does not substantially impede or prevent the required thermal convective circulation of air and water vapor mixture of the apparatus, wherein the condensing means comprises a folded plate condenser cooled by ambient air to which the external surface of said condenser is exposed, wherein the folded plate condenser is cooled both by the ambient air to which it is exposed and by cooling water brought into contact with the outer folded plates of said condenser by suitable application means.

* * * * *